United States Patent
Chiba

(10) Patent No.: US 8,272,366 B2
(45) Date of Patent: Sep. 25, 2012

(54) CONTROL DEVICE FOR INTERNAL COMBUSTION ENGINE

(75) Inventor: Fumito Chiba, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/122,655

(22) PCT Filed: Nov. 6, 2008

(86) PCT No.: PCT/JP2008/070175
§ 371 (c)(1),
(2), (4) Date: Apr. 5, 2011

(87) PCT Pub. No.: WO2010/052775
PCT Pub. Date: May 14, 2010

(65) Prior Publication Data
US 2011/0203553 A1 Aug. 25, 2011

(51) Int. Cl.
*F02M 7/28* (2006.01)
*F02D 41/40* (2006.01)

(52) U.S. Cl. ............... 123/435; 123/478; 123/90.15; 123/676

(58) Field of Classification Search ............ 701/105, 701/109, 113; 123/478, 1 A, 305, 345–348, 123/90.15, 435, 676, 198 A, 431
See application file for complete search history.

(56) References Cited

U.S. PATENT DOCUMENTS
2002/0195078 A1  12/2002  Hasegawa et al.

FOREIGN PATENT DOCUMENTS

| | | |
|---|---|---|
| JP | A-05-001574 | 1/1993 |
| JP | A-2003-003873 | 1/2003 |
| JP | A-2003-286848 | 10/2003 |
| JP | A-2005-083216 | 3/2005 |
| JP | A-2006-283636 | 10/2006 |
| JP | A-2007-198308 | 8/2007 |
| JP | A-2007-315355 | 12/2007 |
| JP | A-2008-180103 | 8/2008 |
| JP | A-2008-184970 | 8/2008 |

OTHER PUBLICATIONS

International Preliminary Report and Patentability and Written Opinion issued in Application No. PCT/JP2008/070175 dated Jun. 30, 2011.

International Search Report issued in Application No. PCT/JP2008/070175; Dated Dec. 9, 2008 (With Translation).

*Primary Examiner* — Hai Huynh
(74) *Attorney, Agent, or Firm* — Oliff & Berridge, PLC

(57) ABSTRACT

A control device which can reduce an exhaust amount of unburned HC at a time of start of an internal combustion engine using a fuel containing alcohol is provided. The control device controls closing timing of an exhaust valve and opening timing of an intake valve so as to close the exhaust valve at a timing at an advance side from an intake top dead center and enlarge a minus overlap until the intake valve is opened after the exhaust valve is closed in accordance with the alcohol concentration of the fuel, for a predetermined time period (hereinafter, a first predetermined time period) at a time of start. The control device controls fuel injection timing so as to start fuel injection in the minus overlap for a second predetermined time period at the time of start which is included in the first predetermined time period.

15 Claims, 4 Drawing Sheets

CONTROL DEVICE FOR INTERNAL COMBUSTION ENGINE

TECHNICAL FIELD

The present invention relates to a control device for an internal combustion engine, and more particularly to a control device for an internal combustion engine which directly injects a fuel containing alcohol into a cylinder.

BACKGROUND ART

As a fuel for an internal combustion engine, a composite fuel is known, in which alcohol such as ethanol and gasoline are mixed. A fuel containing alcohol can be used in internal combustion engines for gasoline. However, alcohol and gasoline have different properties, and therefore, when the fuel containing alcohol is used in an internal combustion engine, control of the internal combustion engine with consideration given to the difference in property is required. For example, Patent Documents such as Japanese Patent Laid-Open No. 2006-283636, Japanese Patent Laid-Open No. 5-1574, Japanese Patent Laid-Open No. 2003-286848, Japanese Patent Laid-Open No. 2005-83216, Japanese Patent Laid-Open No. 2008-180103, and Japanese Patent Laid-Open No. 2007-198308 disclose the inventions relating to control of internal combustion engines when using fuels containing alcohol.

What is remarkable as the difference in property between alcohol and gasoline is the distillation characteristics. The graph of FIG. 6 shows the distillation characteristic of a high-concentration ethanol composite fuel (E85) and the distillation characteristic of gasoline (E0) by comparison. The axis of abscissas of the graph represents a distillation ratio, whereas the axis of ordinates represents a distillation temperature. As shown in the graph, the fuel containing alcohol has a low evaporativity in a low temperature region as compared with gasoline. This is because alcohol has fewer low-boiling point components as compared with gasoline.

The low volatility of alcohol becomes a problem especially at the time of cold start of an internal combustion engine. At the time of cold start of an internal combustion engine, fuel atomization becomes worse as compared with the time after completion of warming up, and therefore, unburned HC which does not contribute to combustion easily adheres to the wall surface of the cylinder. The unburned HC adhering to the cylinder wall surface is scraped up by the ascent of a piston, and is released to an exhaust passage by being contained in the combustion gas when an exhaust valve is opened. Therefore, the combustion gas which is discharged from the internal combustion engine at the time of cold start contains a large amount of unburned HC as compared with the time of completion of warming up. When the fuel contains alcohol, especially in the case of a high concentration alcohol mixed fuel, the amount of the fuel adhering to the cylinder wall surface increases with low volatility of the alcohol mixed fuel, and as a result, the amount of unburned BC discharged from the internal combustion engine also increases.

A catalyst for removing harmful components in the combustion gas is disposed in the exhaust passage of an internal combustion engine. The catalyst is also effective for the fuel containing alcohol, but the catalyst cannot sufficiently exhibit the purification ability in a low-temperature state. Therefore, in the state in which the catalyst temperature is low and the catalyst is inactive as the state at the time of cold start of an internal combustion engine, the unburned HC contained in the combustion gas is not sufficiently purified, and is released into atmosphere. In order to prevent worsening of the exhaust emission at the time of cold start, reduction in the exhaust amount of unburned HC itself is also required in the internal combustion engine using a fuel containing alcohol.

DISCLOSURE OF THE INVENTION

The present invention is made in view of the problem as described above, and has an object to reduce an exhaust amount of unburned HC at a time of start, in an internal combustion engine using a fuel containing alcohol.

A first mode of the present invention is a control device for an internal combustion engine which directly injects a fuel containing alcohol into a cylinder. The control device includes means which acquires information relating to an alcohol concentration of the fuel in use. Such information can be obtained by providing a sensor which outputs a signal corresponding to the alcohol concentration in a fuel tank or a fuel supply system. Further, the theoretical air-fuel ratio changes in accordance with the alcohol concentration, and therefore, the learned value relating to air-fuel ratio control can be used as the information relating to the alcohol concentration. Alternatively, the information relating to the alcohol concentration of the fuel can be acquired from the outside of the vehicle, for example, by information communication with a service station.

According to the first mode of the present invention, the control device reflects the acquired information relating to the alcohol concentration in the valve timing control and the fuel injection timing control at the time of start of the internal combustion engine. With regard to the control of the valve timing, the exhaust valve is closed at a timing at an advance side from an intake top dead center for a predetermined time period (a first predetermined time period) at a time of start. The closing timing of the exhaust valve and the opening timing of the intake valve are controlled so as to enlarge a minus overlap until the intake valve is opened after the exhaust valve is closed in accordance with the alcohol concentration of the fuel. With regard to control of the fuel injection timing, fuel injection timing is controlled so as to start fuel injection in the minus overlap for a second predetermined time period at the time of start which is included in the first predetermined time period.

As a result that such valve timing control and fuel injection timing control are carried out, vaporization of the fuel containing alcohol is promoted by the heat of the gas confined in the cylinder, in particular, the heat of the combustion gas if it is in the second cycle of start and thereafter in which the initial explosion is completed. Further, as the minus overlap is enlarged, the time in which the fuel is exposed to a high-temperature environment becomes longer, and therefore, by taking the minus overlap to be large in accordance with the alcohol concentration of the fuel, the vaporization state of the fuel in the cylinder can be inhibited from being changed in accordance with the value of the alcohol concentration.

What is preferable for the fuel injection timing control is to perform control so as to finish fuel injection in the minus overlap. By finishing the fuel injection before the intake valve is opened, the vaporization promotion effect of the fuel by the heat of the gas in the cylinder can be enhanced.

Further, what is preferable for valve timing control is to control the closing timing of the exhaust valve to increase an advance amount of a crank angle with respect to the intake top dead center, at which the exhaust valve is closed, in accordance with the alcohol concentration of the fuel. Since as the exhaust valve is closed earlier, the compression effect of the gas in the cylinder in the minus overlap becomes higher, and the effect of increasing the cylinder gas temperature due to this also becomes higher, the vaporization state of the fuel in the cylinder can be effectively inhibited from being changed in accordance with the value of the alcohol concentration, by taking the aforesaid advance amount to be large in accordance with the alcohol concentration of the fuel.

A second mode of the present invention is a control device for an internal combustion engine which directly injects a fuel into a cylinder. The control device includes means which acquires information relating to a property of a fuel in use, and determines whether the fuel in use contains alcohol. Whether the fuel contains alcohol may be determined by determining whether the fuel contains alcohol of a concentration exceeding a predetermined reference value. The reference value in that case can be determined by adaptation so that a desired control result can be obtained in consideration of the effect the alcohol concentration gives to discharge of unburned HC.

According to the second mode of the present invention, the control device reflects the aforesaid determination result in valve timing control and fuel injection timing control at the time of start of the internal combustion engine. With regard to control of the valve timing, the exhaust valve is closed at a timing at an advance side from an intake top dead center for a predetermined time period (a first predetermined time period) at a time of start when the fuel in use contains alcohol. Closing timing of the exhaust valve or opening timing of an intake valve is controlled so as to open the intake valve after closing the exhaust valve, that is, so as to provide a minus overlap. With regard to control of the fuel injection timing, fuel injection timing is controlled so as to start fuel injection in a minus overlap for a second predetermined time period at the time of start which is included in the first predetermined time period, when the fuel in use contains alcohol.

As a result that such valve timing control and fuel injection timing control are carried out, vaporization of alcohol in the fuel can be promoted by the heat of the gas confined in the cylinder, in particular, the heat of the combustion gas if it is in the second cycle of start and thereafter in which the initial explosion is completed, when the fuel contains alcohol.

What is preferable for fuel injection timing control is to perform control so as to finish fuel injection in the minus overlap. By finishing fuel injection before the intake valve is opened, the vaporization promotion effect of the fuel by the heat of the gas in the cylinder can be enhanced.

Incidentally, the vaporization promotion effect of the fuel which is obtained by starting the fuel injection in the minus overlap becomes especially high in the situation where the combustion gas exists in the cylinder. Accordingly, what is preferable as the first predetermined time period to the respective modes of the present invention in common is a time period from a first cycle of start forward or from a second cycle of start forward, and what is preferable as the second predetermined time period is a period from the second cycle of start forward. In this case, what is preferable with regard to the fuel injection timing of the first cycle of start is to start fuel injection in proximity to the opening timing of the intake valve.

Further, when fuel injection is performed in the minus overlap, the possibility of occurrence of knocking becomes higher as warming up of the internal combustion engine advances. Therefore, what is preferable as the second predetermined time period is a time period until a representative temperature of the internal combustion engine reaches a predetermined temperature. The representative temperature of the internal combustion engine may be a water temperature or an oil temperature. Alternatively, the representative temperature of the internal combustion engine may be an exhaust gas temperature. The predetermined temperature is preferably determined in consideration of the balance of the possibility of occurrence of knocking and the generation amount of unburned HC when the fuel injection in the minus overlap is finished.

Further, after start of the internal combustion engine, the temperature of the catalyst rises by receiving the heat supply from the exhaust gas, and the exhaust gas purifying ability of the catalyst is activated soon. If the exhaust gas purification ability of the catalyst is activated, even if the exhaust gas from the internal combustion engine contains unburned HC, the exhaust gas can be purified in the catalyst. Accordingly, the second predetermined time period is also preferably a time period until a representative temperature of a catalyst reaches a predetermined temperature. The predetermined temperature in this case is preferably determined with the activation temperature of the catalyst as the reference. The temperature of the catalyst may be the catalyst bed temperature measured by a sensor, or may be the estimated temperature calculated from the history of the temperature of the exhaust gas from start and the history of the operating state of the internal combustion engine.

DESCRIPTION OF NOTATIONS

Figure 1:
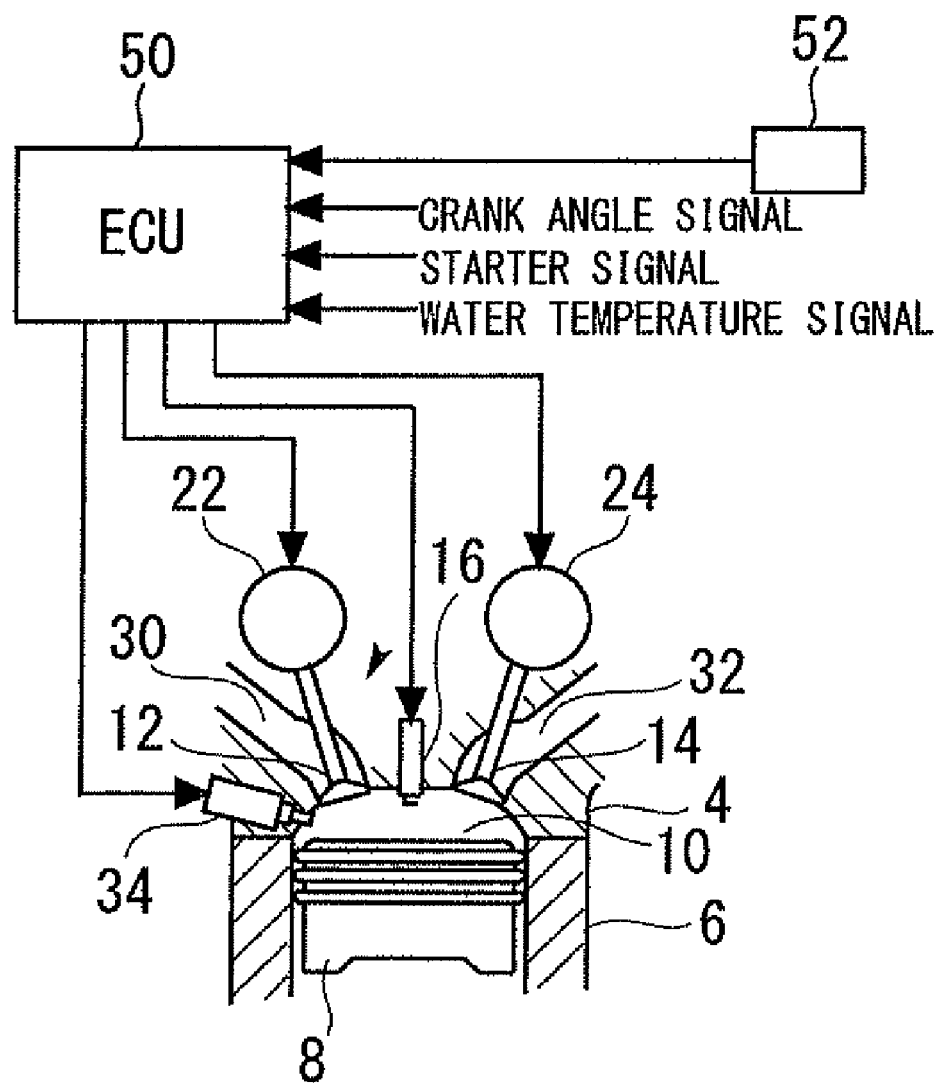
FIG. 1 is a schematic view of an internal combustion engine to which a control device of the present invention can be applied.

4 Cylinder head
6 Cylinder block
8 Piston
10 Combustion chamber
12 Intake valve
14 Exhaust valve
16 Ignition plug
22 Variable valve gear
24 Variable valve gear
30 Intake port
32 Exhaust port
34 Injector
50 ECU
52 alcohol concentration sensor

BEST MODE FOR CARRYING OUT THE INVENTION

Embodiment 1

Hereinafter, embodiment 1 of the present invention will be described with reference to FIGS. 1 to 4.

FIG. 1 is a schematic view of an internal combustion engine to which a control device of the present invention is applied in the present embodiment. The internal combustion engine is a spark ignition type four stroke engine. The internal combustion engine includes a cylinder block 6 in which a piston 8 is disposed, and a cylinder head 4 which is fitted to the cylinder block 6. A space from a top surface of the piston 8 to the cylinder head 4 fowls a combustion chamber 10. An intake port 30 and an exhaust port 32 are formed in the cylinder head 4 to communicate with the combustion chamber 10.

An intake valve 12 which controls a communication state of the intake port 30 and the combustion chamber 10 is provided at a connection portion of the intake port 30 and the combustion chamber 10. The intake valve 12 is equipped with a variable valve gear 22 which can change the valve timing in combination with an operation angle. Further, an exhaust valve 14 which controls a communication state of the exhaust port 32 and the combustion chamber 10 is provided at a connection portion of the exhaust port 32 and the combustion chamber 10. The exhaust valve 14 is equipped with a variable valve gear 24 which changes only the valve timing with its operation angle remaining constant. When the present invention is carried out, the structures of the variable valve gears 22 and 24 are not limited. Besides the system using the mechanism such as a variable valve timing mechanism and a variable lift amount/operation angle mechanism, a motor driven type system which drives a cam for opening and closing an intake valve or an exhaust valve with a motor, and an electromagnetically driven type system which opens and closes an intake valve or an exhaust valve by a solenoid may be adopted.

An ignition plug 16 and an injector 34 are attached to the combustion chamber 10. As is known from the arrangement of the injector 34, the internal combustion engine according to the present embodiment is a cylinder direct-injection type internal combustion engine which directly injects a fuel into the cylinder. Further, the internal combustion engine according to the present embodiment is an internal combustion engine for which a composite fuel of alcohol and gasoline can be used. A fuel stored in a fuel tank is supplied to the injector 34 by a fuel pump not illustrated. An alcohol concentration sensor 52 which outputs a signal corresponding to the alcohol concentration of the fuel is attached to the fuel tank or a fuel pipe. In the present embodiment, ethanol is used as alcohol.

Control of the internal combustion engine according to the present embodiment is performed by an ECU (Electronic Control Unit) 50. In the present embodiment, as one of the functions of the ECU 50, a control device of the present invention is established. Various actuators such as the aforementioned variable valve gears 22 and 24, injector 34, and ignition plug 16 are connected to an output side of the ECU 50. At an input side of the ECU 50, various signals such as a crank angle signal, a water temperature signal, and a starter signal in addition to the signal from the aforementioned alcohol concentration sensor 52. The ECU 50 operates the respective actuators in accordance with a predetermined control program based on these input signals.

Figure 2:
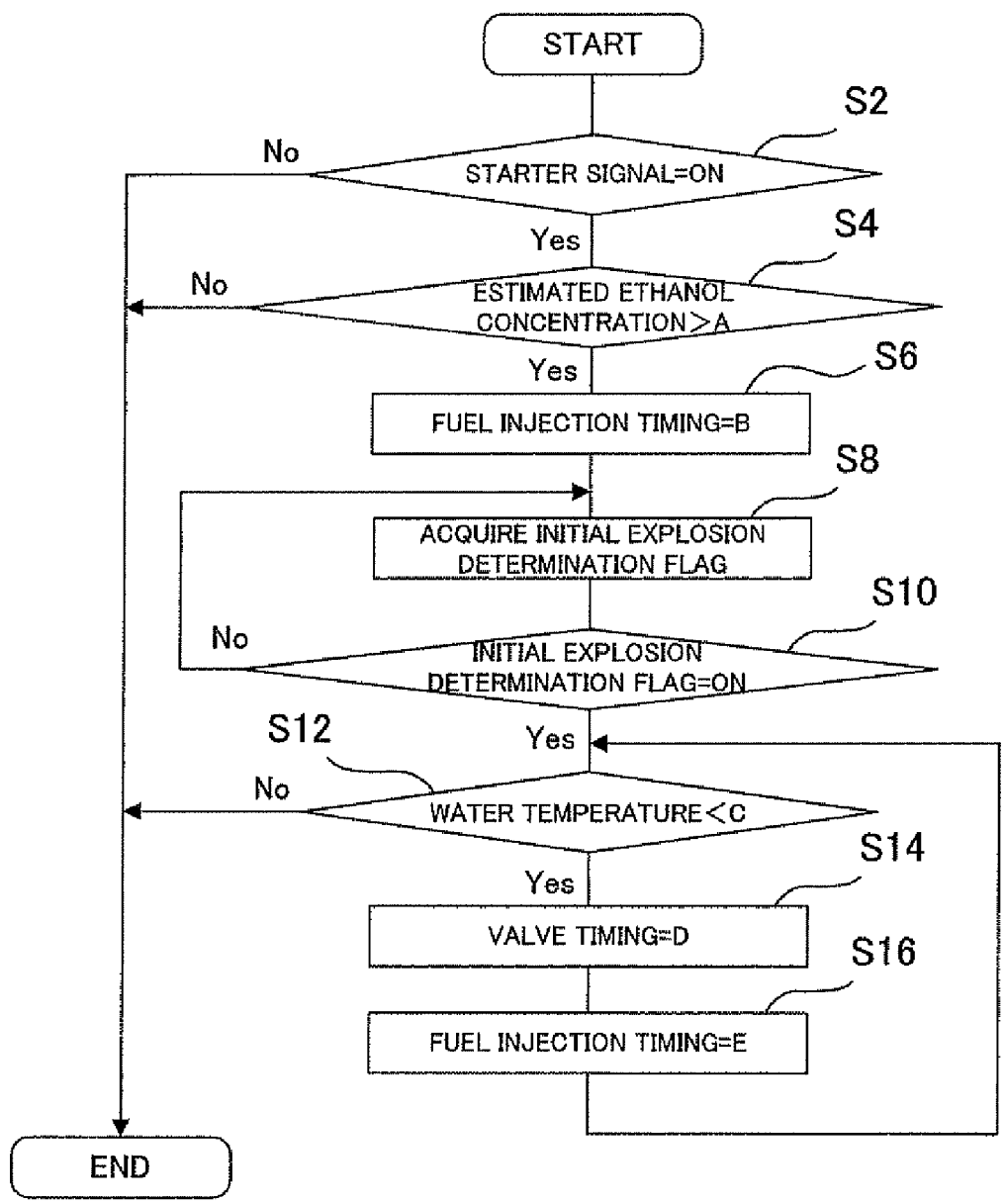
FIG. 2 is a flowchart showing a routine of an injection/valve timing control executed in embodiment 1 of the present invention.

The present invention has a feature in fuel injection timing control and valve timing control at the time of start among controls of the internal combustion engine executed by the ECU 50. FIG. 2 shows of a content of injection/valve timing control executed by the ECU 50 in the present embodiment in a flowchart. Hereinafter, the content of the injection/valve timing control which is executed at the time of start will be described.

In first step S2, on/off of a starter signal is determined. If the starter signal is not inputted, the present routine terminates, and if the starter signal is inputted, the processing of step S4 and the following steps is performed. Cranking of the internal combustion engine by the starter is started by turning on the starter signal, and at the same time, injection/valve timing control according to the present routine is started.

In step S4, the ethanol concentration of the fuel which is in use at present is estimated based on the signal of the alcohol concentration sensor 52. Subsequently, a magnitude relation between the estimated ethanol concentration and a predetermined threshold concentration A is determined. When the estimated ethanol concentration is the threshold concentration A or lower, the present routine terminates, and normal injection/valve timing control is executed. If the estimated ethanol concentration exceeds the threshold concentration A, the processing of step S6 and the following steps is performed. The specific value of the threshold concentration A can be arbitrarily set in accordance with the design concept of a designer. For example, with the error of the signal of the alcohol concentration sensor 52 taken into consideration, the value by which mixing of ethanol can be reliably determined may be set as the threshold concentration A. Alternatively, an experiment is performed on the influence given to the vaporization state of the fuel by the presence and absence of the injection/valve timing control at the time of cold start by the present routine, and the ethanol concentration at which the effect is remarkably exhibited is used as the threshold concentration A.

In step S6, setting of the fuel injection timing in the first cycle of start is performed. Fuel injection timing B which is set at the first cycle of start is set so that fuel injection is started in proximity to the opening timing of the intake valve. This is for agitating the fuel by using the flow of air flowing into the combustion chamber 10 from the intake port 30 to promote vaporization of the fuel. When the present invention is carried out, the valve timing of the first cycle of start is not limited. In this case, the valve timing of the exhaust valve 14 is assumed to be set at the most advanced position, and as to the valve timing of the intake valve 12, the opening timing of it is assumed to be set at the position at a slightly advanced side from the intake top dead center.

In the next step S8, an initial explosion completion flag is acquired. Determination of completion of the initial explosion is performed in another routine in parallel with the present routine. Determination of completion of the initial explosion is also the determination of whether or not the first cycle of start is finished. Whether the initial explosion is completed or not can be determined from the rotational angle of the crankshaft which is calculated from the crank angle signal. When the rotational angle of the crankshaft exceeds the rotational speed necessary for initial explosion, the fuel for initial explosion is injected from the injector 34. The cycle in which the fuel for initial explosion is injected is the first cycle of start. When completion of the initial explosion is determined, the flag is set. In step S10, it is determined whether the initial explosion completion flag is turned on. Until the initial explosion completion flag is turned on, the processing of step S8 and step S10 is repeatedly performed.

When the initial explosion completion flag is turned on, temperature determination is performed in step S12, next. In this case, it is determined whether the representative temperature of the internal combustion engine is lower than a predetermined threshold temperature C. As the representative temperature, a water temperature, an oil temperature, an exhaust gas temperature and the like are cited, and in this case, the water temperature which is obtained by a water temperature sensor of the internal combustion engine is used as the representative temperature. The threshold temperature C is the temperature from which it can be determined that warmingup of the internal combustion engine is completed. When the water temperature is lower than the threshold temperature C, the processing of step S14 and step S16 which will be described later is performed. Meanwhile, when the water temperature is the threshold temperature C or higher, the injection/valve timing control at the time of cold start by the present routine is terminated, and ordinary, that is, warm-time injection/valve timing control is performed.

Figure 3:
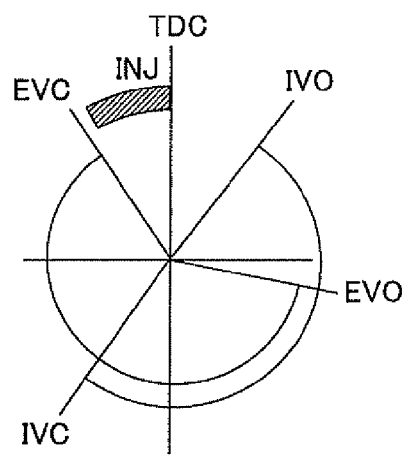
FIG. 3 is a diagram showing injection/valve timing at the time of cold start which is adopted in the embodiment 1 of the present invention.
Figure 4:
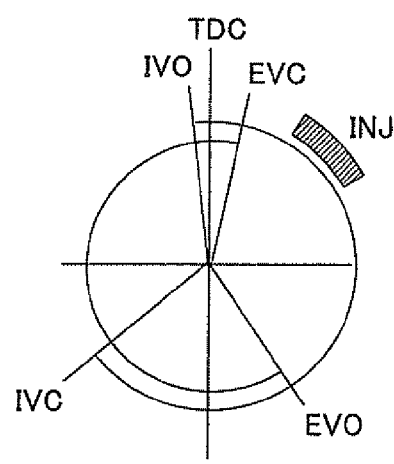
FIG. 4 is a diagram showing injection/valve timing at the warm time which is adopted in the embodiment 1 of the present invention.

FIGS. 3 and 4 are diagrams showing injection/valve timing which is adopted in the present embodiment. FIG. 3 shows the injection/valve timing at the time of cold start which is set in step S14 and step S16, whereas FIG. 4 shows the injection/valve timing at the warm time. In each of the drawings, EVO represents opening timing of the exhaust valve 14, EVC represents closing timing of the exhaust valve 14, IVO represents opening timing of the intake valve 12, and IVC represents closing timing of the intake valve 12. Further, a section INJ represents a section from a start timing to termination timing of fuel injection, that is, a fuel injection time period.

When the water temperature is lower than the threshold temperature C, setting of the valve timing of the second cycle of start and thereafter is performed in step S14. FIG. 3 shows setting D of the valve timing of the second cycle of start and thereafter. In FIG. 3, EVC is set at a position at an advance side from an intake top dead center, and IVO is set at a position at a delay side from the intake top dead center. According to the setting of the valve timing shown in FIG. 3, a so-called minus overlap until the intake valve 12 is opened after the exhaust valve 14 is closed occurs. In step S14, the value of the minus overlap is determined in accordance with the ethanol concentration acquired in step S4, and EVC and IVO are controlled so as to realize the determined minus overlap. Further, in step S14, EVC and IVO are controlled so that the advance amount of EVC with respect to the intake top dead center and the delay amount of IVO with respect to the intake top dead center are substantially equal. With regard to IVO, IVO is delayed in synchronism with reduction of the operation angle of the intake valve 12.

Further, when the water temperature is lower than the threshold temperature C, setting of the fuel injection timing of the second cycle of start and after the second cycle is performed in step S16. FIG. 3 shows setting E of the fuel injection timing of the second cycle of start and after the second cycle. In FIG. 3, the fuel injection timing is set so that fuel injection is started after EVC, and the fuel injection is terminated before IVO. In step S16, the fuel injection time period is controlled so that fuel injection is started in the minus overlap and the fuel injection is terminated in the minus overlap, based on the value of the minus overlap determined in step S14. However, depending on the fuel injection amount, the required fuel injection time period can be longer than the minus overlap. In such a case, higher priority is given to starting fuel injection in the minus overlap, and extension of the termination timing of the fuel injection from the minus overlap is allowed. What is preferable as the start timing of the fuel injection is in proximity to the intake top dead center where the temperature in the cylinder becomes the highest due to compression of the gas in the cylinder.

The processing of step S12 to step S16 is repeatedly performed until the water temperature reaches the threshold temperature C. As a result that the injection/valve timing control by step S14 and step S16 is carried out, vaporization of the fuel is promoted by the heat of the combustion gas confined in the cylinder. Further, as the minus overlap is enlarged, the time in which the fuel is exposed to the high-temperature environment becomes larger, and therefore, by taking the minus overlap to be large in accordance with the ethanol concentration of the fuel, the vaporization state of the fuel in the cylinder can be inhibited from being changed depending on the value of the ethanol concentration.

When it is determined that the water temperature reaches the threshold temperature C in step S12, the setting of the valve timing and the setting of the fuel injection timing are respectively changed to the settings shown in FIG. 4. More specifically, EVC is changed to the position which is slightly at the delay side from the intake top dead center, and IVO is changed to the position at the advance side from the intake top dead center. Especially with regard to IVO, IVO is advanced in synchronism with increase of the operation angle of the intake valve 12. Further, the fuel injection timing is changed so that fuel injection is started in the intake stroke after EVC. The reason of the injection/valve timing being changed in this manner is for preventing knocking from being induced by fuel injection under the high-temperature environment, and for enhancing fuel efficiency by optimizing the valve timing. Accordingly, the threshold temperature C for use in water temperature determination is desirably determined in consideration of the balance of the possibility of occurrence of knocking when the setting shown in FIG. 3 is continued and the generation amount of the unburned HC when the setting is changed to the setting shown in FIG. 4.

By performing the fuel injection timing control and the valve timing control described above at the time of start of the internal combustion engine, vaporization of the fuel in the cylinder is promoted, and adherence of the fuel to the cylinder wall surface can be suppressed. Consequently, according to the control device of the present embodiment, even when the fuel containing alcohol such as ethanol is used, the exhaust amount of the unburned HC at the time of start can be reduced.

Embodiment 2

Next, embodiment 2 of the present invention will be described with reference to FIG. 5.

A control device as embodiment 2 of the present invention is applied to the internal combustion engine with the configuration as shown in FIG. 1 as in embodiment 1. Accordingly, in the following description, the description will be made with the configuration shown in FIG. 1 as the precondition as in embodiment 1.

The present embodiment has the feature in setting of injection/valve timing which is adopted at the time of cold start. According to the present embodiment, injection/valve timing which is set in step S14 and step S16 of the routine shown in FIG. 2 has the setting as shown in FIG. 5. In FIG. 5, IVO is set in proximity to the intake top dead center, and EVC is set at the position significantly advanced from the intake top dead center. More specifically, in the section where the piston 8 is ascending, the minus overlap is taken. The fuel injection timing is set at the position near the intake top dead center in the minus overlap.

Figure 5:
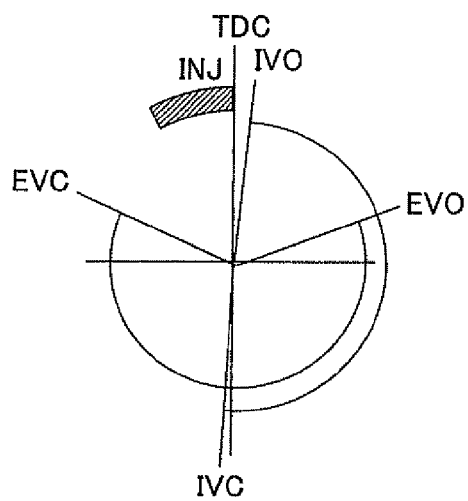
FIG. 5 is a diagram showing injection/valve timing at the time of cold start which is adopted in embodiment 2 of the present invention.
Figure 6:
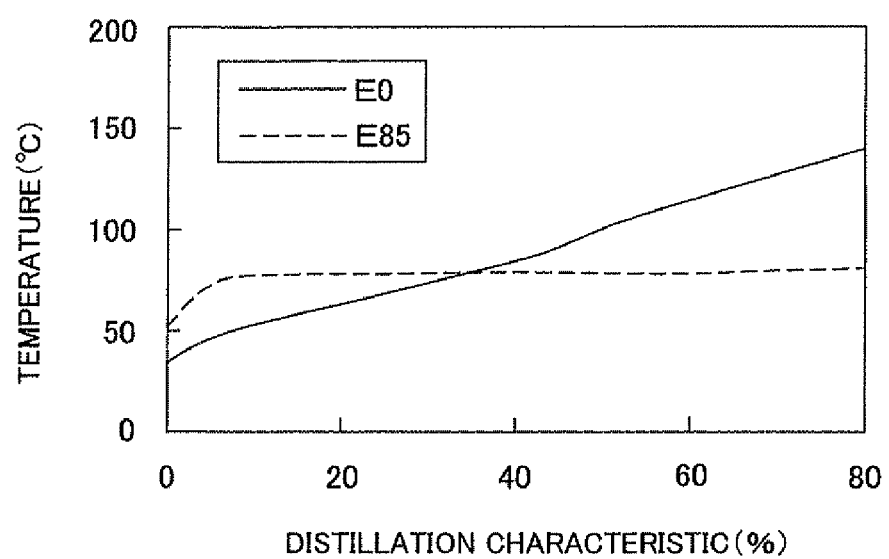
FIG. 6 is a diagram showing the distillation characteristics of some fuels.

According to the setting of the valve timing shown in FIG. 5, the gas in the cylinder which is compressed by the piston 8 after EVC is blown back to the intake port 30 in IVO. Therefore, compression work by the piston 8 becomes a loss. However, meanwhile, the rising effect of the cylinder gas temperature by compression of the gas in the cylinder becomes high, and therefore, the fuel vaporization promotion effect which is obtained by fuel injection in the minus overlap is enhanced. In the present embodiment, the value of the minus overlap is determined in accordance with the ethanol concentration obtained in step S4, and the advance amount of EVC is controlled so as to realize the determined minus overlap. The minus overlap is enlarged by taking the advance amount EVC to be large in accordance with the ethanol concentration, and thereby, the fuel vaporization state in the cylinder can be more effectively inhibited from being changed by the value of the ethanol concentration.

Others

The present invention is not limited to the aforementioned embodiments. In embodiments 1 and 2, "means which acquires information relating to an alcohol concentration", "means which determines a fuel property", "means which controls fuel injection timing" and "means which controls valve timing" are embodied, but the configurations disclosed in them are only examples of the configurations which these means can adopt. All the configurations capable of realizing the functions of the respective means are included in the range of the respective means.

With regard to the means which acquires the information related to an alcohol concentration, the information relating to the alcohol concentration can be obtained from the learned value relating to air-fuel ratio control. When the theoretical air-fuel ratio is changed in accordance with the alcohol concentration, the change is reflected in the feedback control amount based on the output value of the air-fuel ratio sensor. The learned value which is obtained from the feedback control amount is stored in the memory, and therefore, by reading the value at the time of turning on the starter signal, the alcohol concentration of the fuel in use can be estimated. Further, when communication can be made between a service station and a vehicle, and the service station provides the information concerning the alcohol concentration of the fuel, the information may be received.

Further, setting of the injection/valve timing shown in FIG. 3 or FIG. 5 may be taken from the first cycle of start instead of the second cycle of start. However, with regard to the fuel injection timing, the fuel injection timing is set in proximity to IVO in the first cycle of start, and is preferably switched to the timing shown in FIG. 3 or FIG. 5 from the second cycle of start. This is because the rising effect of the cylinder gas temperature by compression of the gas in the cylinder in the minus overlap is obtained, but since the combustion gas is absent in the cylinder in the first cycle of start, and therefore, the vaporization promotion effect by fuel injection in the minus overlap is limited.

Further, the timing of switching the setting of injection/valve timing to the setting shown in FIG. 4 may be determined from the catalyst temperature instead of the water temperature. After start of the internal combustion engine, the temperature of the catalyst rises by receiving heat supply from the exhaust gas, and soon, the exhaust gas purification ability of the catalyst is activated. If the exhaust gas purification ability of the catalyst is activated, even if the unburned HC is contained in the exhaust gas from the internal combustion engine, the unburned HC can be purified in the catalyst. Accordingly, when the catalyst temperature reaches the activation temperature, setting of the injection/valve timing is switched to the setting of the warm time, and suppression of the unburned HC may be left to the catalyst. The temperature of the catalyst may be directly measured by the sensor, or may be obtained by calculation based on the information relating to the catalyst temperature such as an exhaust gas temperature, the driving state and the like.

The invention claimed is:

1. A control device for an internal combustion engine which directly injects a fuel containing alcohol into a cylinder, comprising:

alcohol concentration information means which acquires information relating to an alcohol concentration of the fuel in use;

valve timing control means which controls closing timing of an exhaust valve and opening timing of an intake valve so as to close the exhaust valve at a timing at an advance side from an intake top dead center, and enlarge a minus overlap until the intake valve is opened after the exhaust valve is closed in accordance with the alcohol concentration of the fuel, for a first predetermined time period at a time of start; and fuel injection timing control means which controls fuel injection timing so as to start fuel injection in the minus overlap for a second predetermined time period at the time of start which is included in the first predetermined time period.

2. The control device for an internal combustion engine according to claim 1, wherein the fuel injection timing control means controls the fuel injection timing so as to finish fuel injection in the minus overlap.

3. The control device for an internal combustion engine according to claim 1, wherein the valve timing control means controls the closing timing of the exhaust valve to increase an advance amount of a crank angle with respect to the intake top dead center, at which the exhaust valve is closed, in accordance with the alcohol concentration of the fuel.

4. The control device for an internal combustion engine according to claim 1, wherein the first predetermined time period is a time period from a first cycle of start and thereafter or from a second cycle of start and thereafter, and the second predetermined time period is a period from the second cycle of start and thereafter.

5. The control device for an internal combustion engine according to claim 4, wherein the fuel injection timing control means controls the fuel injection timing so as to start fuel injection in proximity to the opening timing of the intake valve in the first cycle of start.

6. The control device of an internal combustion engine according to claim 1, wherein the second predetermined time period is a time period until a representative temperature of the internal combustion engine reaches a predetermined temperature.

7. The control device for an internal combustion engine according to claim 1, wherein the second predetermined time period is a time period until a representative temperature of a catalyst which is disposed in an exhaust passage of the internal combustion engine reaches a predetermined temperature.

8. A control device for an internal combustion engine which directly injects a fuel into a cylinder, comprising:

fuel property determining means which acquires information relating to a property of a fuel in use, and determines whether the fuel in use contains alcohol;

valve timing control means which controls closing timing of an exhaust valve and opening timing of an intake valve so as to close the exhaust valve at a timing at an advance side from an intake top dead center and open the intake valve after closing the exhaust valve, for a first predetermined time period at a time of start, when the fuel contains alcohol; and fuel injection timing control means which controls fuel injection timing so as to start fuel injection in a minus overlap until the intake valve is opened after the exhaust valve is closed for a second predetermined time period at the time of start which is included in the first predetermined time period, when the fuel contains alcohol.

9. The control device for an internal combustion engine according to claim 8, wherein the fuel injection timing control means controls the fuel injection timing so as to finish fuel injection in the minus overlap.

10. The control device for an internal combustion engine according to claim 8, wherein the first predetermined time period is a time period from a first cycle of start and thereafter or from a second cycle of start and thereafter, and the second predetermined time period is a time period from the second cycle of start and thereafter.

11. The control device for an internal combustion engine according to claim 10, wherein the fuel injection timing control means controls the fuel injection timing so as to start fuel injection in proximity to the opening timing of the intake valve in the first cycle of start.

12. The control device for an internal combustion engine according to claim 8, wherein the second predetermined time period is a time period until a representative temperature of the internal combustion engine reaches a predetermined temperature.

13. The control device for an internal combustion engine according to claim 8, wherein the second predetermined period is a time period until a representative temperature of a catalyst which is disposed in an exhaust passage of the internal combustion engine reaches a predetermined temperature.

14. A control device for an internal combustion engine which directly injects a fuel containing alcohol into a cylinder, comprising:

an information acquisition unit which acquires information relating to an alcohol concentration of the fuel in use;

a valve timing control unit which controls closing timing of an exhaust valve and opening timing of an intake valve so as to close the exhaust valve at a timing at an advance side from an intake top dead center, and enlarge a minus overlap until the intake valve is opened after the exhaust valve is closed in accordance with the alcohol concentration of the fuel, for a first predetermined time period at a time of start; and a fuel injection timing control unit which controls fuel injection timing so as to start fuel injection in the minus overlap for a second predetermined time period at the time of start which is included in the first predetermined time period.

15. A control device for an internal combustion engine which directly injects a fuel into a cylinder, comprising:

a fuel property determining unit which acquires information relating to a property of a fuel in use, and determines whether the fuel in use contains alcohol;

a valve timing control unit which controls closing timing of an exhaust valve and opening timing of an intake valve so as to close the exhaust valve at a timing at an advance side from an intake top dead center and open the intake valve after closing the exhaust valve, for a first predetermined time period at a time of start, when the fuel contains alcohol; and a fuel injection timing control unit which controls fuel injection timing so as to start fuel injection in a minus overlap until the intake valve is opened after the exhaust valve is closed for a second predetermined time period at the time of start which is included in the first predetermined time period, when the fuel contains alcohol.

\* \* \* \* \*